United States Patent [19]

Bosshart et al.

[11] 4,050,535
[45] Sept. 27, 1977

[54] ARTICULATED VEHICLE

[75] Inventors: John H. Bosshart, Cambridge-Galt; Emil J. David, Thunder Bay, both of Canada

[73] Assignee: Eaton Yale Ltd., Canada

[21] Appl. No.: 664,230

[22] Filed: Mar. 5, 1976

[51] Int. Cl.$^2$ .............................................. B62D 53/00
[52] U.S. Cl. .................................. 180/51; 280/423 R; 296/28 C
[58] Field of Search ............... 180/51, 89 R; 280/756, 280/423 R; 214/DIG. 7; 37/126 R, 129; 296/102, 28 C

[56] References Cited

U.S. PATENT DOCUMENTS

| | | | |
|---|---|---|---|
| 2,805,887 | 9/1957 | Selby | 280/756 X |
| 3,007,590 | 11/1961 | Mathew et al. | 180/51 X |
| 3,049,186 | 8/1962 | Garrett | 180/51 |
| 3,060,471 | 10/1962 | Yuen et al. | 180/89 R X |
| 3,167,147 | 1/1965 | Symons et al. | 180/51 |
| 3,280,931 | 10/1966 | Cahill et al. | 180/89 R X |
| 3,713,688 | 1/1973 | Monroe | 280/756 |
| 3,887,220 | 6/1975 | Hall | 280/423 R |

*Primary Examiner*—Philip Goodman
*Attorney, Agent, or Firm*—Teagno & Toddy

[57] ABSTRACT

An articulated vehicle in which one of the articulation pivots is mounted on the canopy of the vehicle. At least one of the hinge members of the pivot is in the form of a wide plate member to provide additional overhead protection for components mounted on the vehicle.

5 Claims, 3 Drawing Figures

ARTICULATED VEHICLE

This invention relates to articulated vehicles, and more particularly to an improved frame structure and articulating connection for such vehicles.

In articulated vehicles, such as log skidders, the prior art practice has been to provide two pivot connections closely spaced apart along a generally vertical axis of articulation. This close spacing of the pivots has been largely a matter of expedience since one or both of the frames of many of such vehicles are quite shallow, making it impractical to obtain substantial spacing between the pivots. In a log skidder, for example, the front frame is stepped down at the rear to provide an operator's station, and the rear frame, which generally supports a winch and a fairlead, is made as shallow as possible to provide a low center of gravity, and to some extent, to provide clearance for a portion of the operator's station. It can be appreciated, then, that the provision of two closely spaced hinge assemblies, and the associated steer cylinder mounting means, leave very little room in which to run the drive line components, control and electrical cables, and hydraulic lines which must pass between the frames.

In recent years greater and greater emphasis is being placed on operator safety and convenience in industrial vehicles. As a result, many of such vehicles are required to have cab or canopy structures having sufficient strength and rigidity to give complete rollover protection. Such rollover protective structures are now commonly referred to as ROPS, and their primary purpose is to reduce the possibility of an operator who is wearing a seat belt being crushed should his vehicle roll over. As a result of such requirements, a good deal of sophistication has entered into the design of the canopy structure; however, little has been done to use the canopy structure as an integral part of the frame structure to support necessary components of the vehicle.

What this invention seeks to accomplish is to solve certain of the problems inherent in the traditional design of articulated vehicles by using the canopy structure of such a vehicle to full advantage as a structural member.

Accordingly, it is an object of the invention to provide an articulated vehicle in which ample space is provided between the frame members to run the necessary drive and control components from one frame to the other without undue crowding.

Another object of the invention is to provide an articulated vehicle having improved stability.

Another object of the invention is to provide an articulated vehicle of lighter weight and having improved loading characteristics on critical elements of the vehicle.

In accordance with the invention, the above objectives are accomplished by using the cab or canopy structure of the vehicle as a base for mounting one of the pivot assemblies which provide vehicle articulation while leaving the second pivot assembly in its usual place at the extreme bottom end of the frame structure. By so spreading out the pivot points, a significant amount of additional space is made available in the area between the frames for the orderly arrangement of drive shafts, cables, hoses and the like, which run between the frames.

More specifically, the upper hinge member for the front frame section is mounted on top of the canopy structure, over the operator's station. The corresponding hinge member for the rear frame is mounted on a flat plate member extending horizontally from a tower assembly extending vertically from the rear frame of the vehicle, the flat plate member additionally serving as an overhead shield for components mounted on the rear frame.

By this construction, maximum spacing of the pivot points is achieved, significantly reducing the loading of the frame members supporting the pivot assemblies in resisting the forces which tend to collapse the vehicle at the articulation axis. As a result, lighter weight frame members can be used.

IN THE DRAWINGS

For purposes of illustration, the invention is disclosed as it is applied to an articulated log skidder; however, it can be appreciated that certain aspects of the invention are applicable to other types of articulated vehicles.

Figure 1:
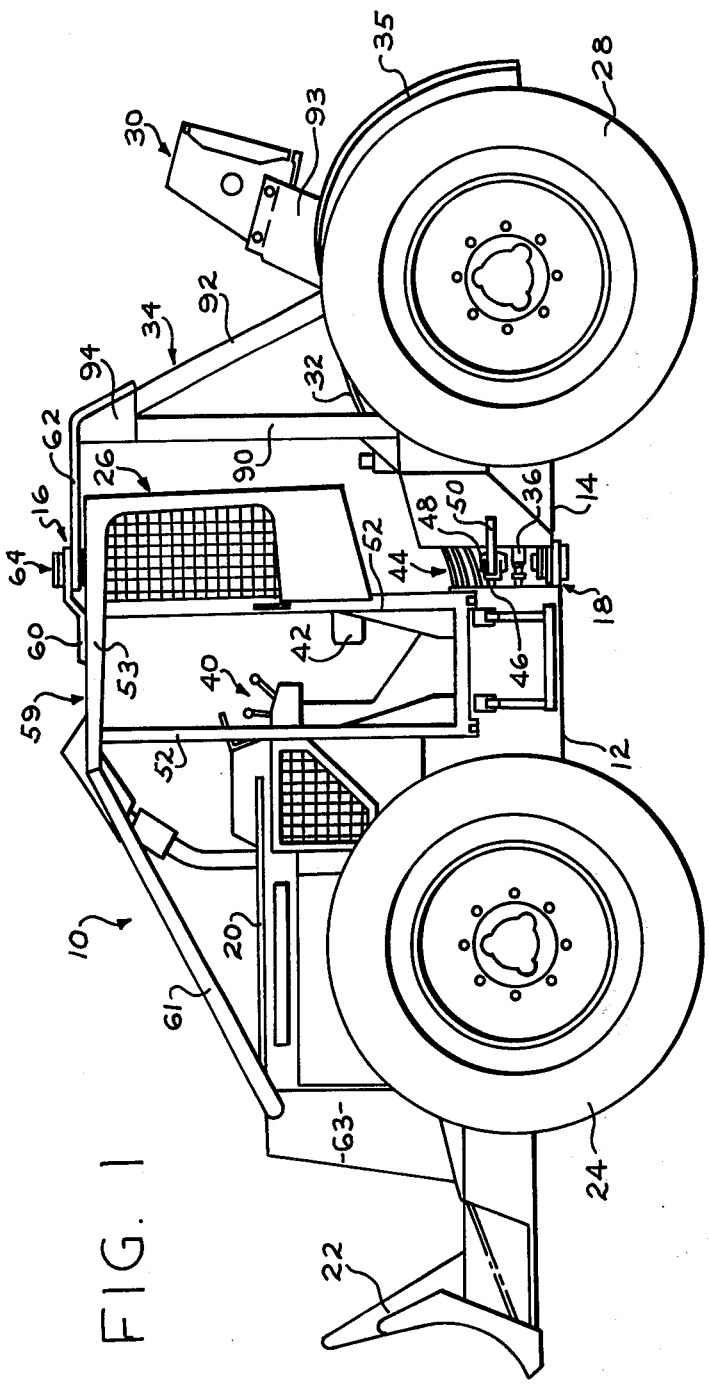
FIG. 1 is a side elevation view of a log skidder constructed in accordance with the invention.

Referring to FIG. 1, there is shown a log skidder, designated generally by the numeral 10, comprising a front frame 12, and a rear frame 14, connected by upper and lower pivot or hinge assemblies 16 and 18 respectively.

Mounted on the front frame 12 are an engine compartment 20, a clearing or dozer blade 22, a pair of front driving wheels 24, and an operator's cab or canopy assembly 26. Mounted on the rear frame 14 are a pair of rear drive wheels 28, a fairlead assembly 30, a winch 32, a pivot support assembly 34, and a butt pan 35.

The vehicle engine and transmission (not shown) are located on the front frame and drive all four wheels through a transfer case (not shown). A drive shaft 36 from the transfer case to a rear drive axle 38 crosses between the two frames.

The skidder 10 is controlled entirely from the front frame 12, which further includes vehicle operation and winch controls 40, and a seat 42, located within an operator's station defined by the canopy assembly 26.

There are two types of winches employed on vehicles of this types, one driven mechanically through a power take-off system, and one hydraulically driven using pressurized oil supplied by engine driven pump. In the illustrative embodiment, a hydraulic winch is shown, requiring a plurality of hydraulic supply, return and control lines, designated generally by the numeral 44, to pass between the front and rear frames.

Steering is provided by a hydraulic cylinder (not shown) mounted on the front frame 12 and having a piston rod 46 extending toward the rear frame 14. The piston rod 46 is pivotally connected, by means of a clevis 48, to a bracket plate 50 welded or otherwise fastened to the rear frame.

In accordance with current safety requirements, the cab or canopy assembly 26 is a rigid structure capable of withstanding rollovers and other potentially serious accidents without suffering damage severe enough to injure the operator. To provide the strength required for such protection, the canopy 26 comprises a well-braced tubular structure including four vertical pillars 52 rigidly attached to the front frame 12 and connected at the top by a plate member 53 bent into a U-shape in plan view (FIG. 2), which extends rearwardly beyond the rear pillars 52 to partially enclose and define the operator's station. Further rigidity at the upper end of the canopy is provided by a front transverse cross member 54 and central transverse cross members 55 and 56, welded or otherwise fastened to the plate member 53, and angle braces 57 welded or otherwise fastened to the front transverse member 54 and central transverse member 55. A solid plate 58 is securely fastened to the overhead structure formed by the upper ends of the pillars 52, the plate member 53 and the cross members and braces 54–57 to form an integral roof structure 59. Additional bracing is provided by elongated tubular members 61 attached between the forward ends of the plate member 53 and a radiator support 63 attached to the front frame 12.

Figure 3:
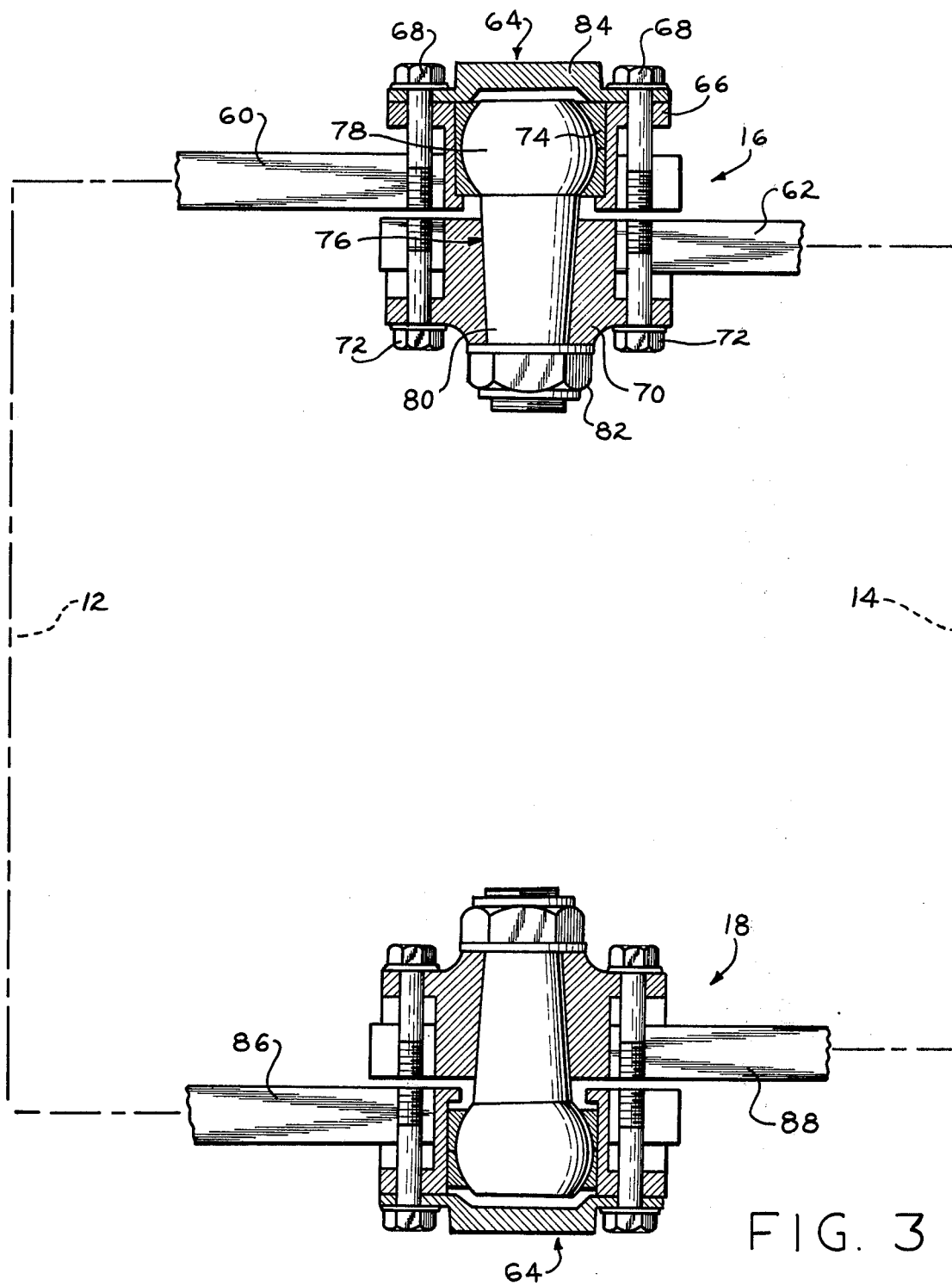
FIG. 3 is a fragmentary sectional view taken through the pivot axis of the skidder.

In accordance with the present invention, the above-described canopy structure serves as a base for one of the pivot assemblies which provide vehicle articulation. The upper pivot assembly 16 comprises a front hinge plate 60, which is formed into an S-shape in elevation as shown in FIG. 1, and having its lower leg rigidly attached to the roof structure 59; a rear hinge plate 62, which will be described in more detail; and a pin and bearing assembly 64 (FIG. 3) pivotally connecting the two hinge plates.

The pin and bearing assembly 64 comprises a first sleeve 66 received in a bore formed in the front hinge plate 60 and fastened to the hinge plate by bolts 68, a second sleeve 70 similarly received in the rear hinge plate 62 and fastened thereto by bolts 72, a spherical bearing 74 received in the first sleeve 66, and a pivot pin 76 having a spherical end 78 received in the bearing 74 and a tapered end 80 received in the second sleeve 70 and non-rotatably held therein by a nut 82 received on a threaded end portion of the pin. A cover 84 fastened to the first sleeve 66 by the bolts 68 protects the bearing assembly against the entry of contaminants.

The lower pivot assembly 18 comprises a front hinge plate 86 welded or otherwise fastened to the front frame 12, a rear hinge plate 88 welded or otherwise fastened to the rear frame 14, and a second pin and bearing assembly 64, as described above.

Figure 2:
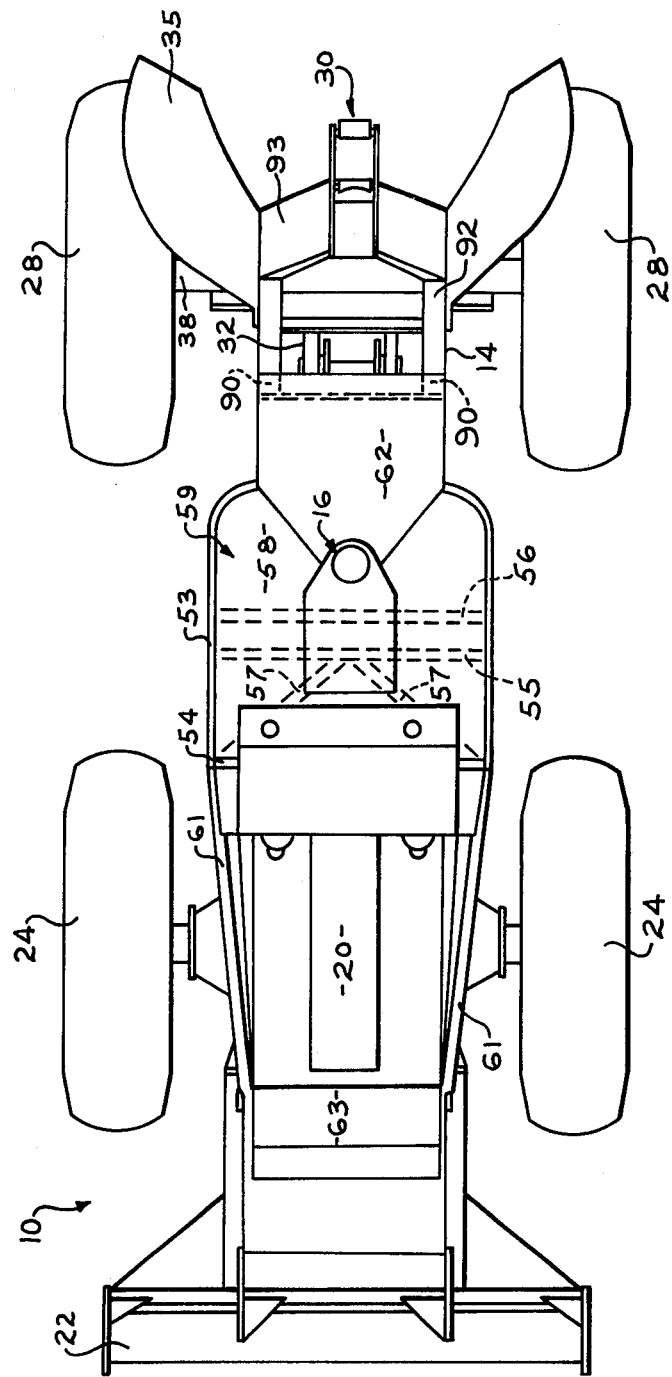
FIG. 2 is a plan view of the skidder of FIG. 1.

The rear pivot support assembly 34 comprises a pair of transversely spaced vertical support members 90 attached to the rear frame 14 at their bottom ends; a pair of bracing members 92, attached at their bottom ends to the base 93 of the fairlead assembly 30 and angled forward to attach at their top ends to the top ends of the vertical members 90; and rear hinge plate 62, which is welded or otherwise fastened to the members 90 and 92 at their junction. Gusset plates 94 are welded to the sides of the members 90 and 92 and to the hinge plate 62 for added strength. Referring to FIG. 2, the rear hinge plate 62 extends the full width of the rear frame 14 in the area between the front and rear frames, thus providing additional overhead protection to the winch 32 and other components on the rear frame.

We claim:

1. In an articulated vehicle having a first frame, and a second frame pivotally connected to said first frame about a substantially vertical axis of articulation: a canopy structure mounted on said first frame and defining an operator's station, first and second hinge assemblies defining said axis of articulation, said first hinge assembly comprising a first upper hinge plate attached to and supported by said canopy structure above said operator's station, a second upper hinge plate mounted on said second frame and a pin member connecting said hinge plates for rotation about said axis of articulation, and said second hinge assembly comprising a first lower hinge plate mounted at or adjacent the extreme lower end of said first frame, a second lower hinge plate mounted at or adjacent the extreme lower end of said second frame, and a pin member connecting said hinge plates for rotation therebetween about said axis of articulation.

2. Apparatus as claimed in claim 1, including a support assembly connecting said second upper hinge plate to said second frame, said support assembly comprising one or more column members extending substantially vertically upward from said second frame, said second upper hinge plate comprising a substantially horizontally disposed plate attached to one or more of said column members and extending toward said first frame.

3. Apparatus as claimed in claim 2 in which said support assembly comprises first and second substantially vertical column members spaced apart along a line transverse to the longitudinal centerline of said second frame, and said second upper hinge plate comprises a plate member having a maximum dimension transverse to the longitudinal centerline of said vehicle which is substantially as great as the maximum transverse dimension of said second frame.

4. Apparatus as claimed in claim 1, in which said canopy structure comprises a plurality of spaced apart vertical pillar members attached at their lower ends to said first frame, and a plurality of horizontal members connecting the upper ends of said pillar members, said first hinge member being operatively attached to one or more of said horizontal members.

5. Apparatus as claimed in claim 4, including a horizontally disposed flat plate member attached to one or more of said horizontal members and substantially closing the spaces between the ends of said pillar members and said horizontal members.

* * * * *